US012617036B2

(12) United States Patent
Kloepfer et al.

(10) Patent No.: US 12,617,036 B2
(45) Date of Patent: May 5, 2026

(54) RETURN CURRENT ROLLER FOR AUTOMATIC WELDER

(71) Applicant: Titan Trailers Inc., Delhi (CA)

(72) Inventors: Michael Kloepfer, Delhi (CA); Tom Pursley, Harley (CA)

(73) Assignee: Titan Trailers Inc., Delhi (CA)

( * ) Notice: Subject to any disclaimer, the term of this patent is extended or adjusted under 35 U.S.C. 154(b) by 1466 days.

(21) Appl. No.: 17/122,913

(22) Filed: Dec. 15, 2020

(65) Prior Publication Data

US 2021/0178504 A1 Jun. 17, 2021

Related U.S. Application Data

(60) Provisional application No. 62/948,412, filed on Dec. 16, 2019.

(51) Int. Cl.
| | |
|---|---|
| *B23K 9/127* | (2006.01) |
| *B23K 9/02* | (2006.01) |
| *B23K 9/095* | (2006.01) |
| *B23K 9/10* | (2006.01) |

(52) U.S. Cl.
CPC .......... *B23K 9/1278* (2013.01); *B23K 9/0216* (2013.01); *B23K 9/0956* (2013.01); *B23K 9/10* (2013.01)

(58) Field of Classification Search
CPC .. B23K 9/1278; B23K 9/0216; B23K 9/0956; B23K 9/10; B23K 9/127
USPC ................................. 219/136, 130.01, 130.1
See application file for complete search history.

(56) References Cited

U.S. PATENT DOCUMENTS

| | | | | |
|---|---|---|---|---|
| 2,086,305 | A | * 7/1937 | Sessions | B23K 13/02 |
| | | | | 219/67 |
| 2,439,740 | A | 4/1948 | Johnson | |
| 2,695,942 | A | * 11/1954 | Darner | H02G 5/04 |
| | | | | 219/60 R |
| 3,573,425 | A | 4/1971 | Damon | |
| 3,596,048 | A | * 7/1971 | Maeda | B23K 37/02 |
| | | | | 228/8 |
| 4,010,346 | A | 3/1977 | Cecil et al. | |

(Continued)

FOREIGN PATENT DOCUMENTS

| | | | |
|---|---|---|---|
| CN | 201669519 U | * 12/2010 | |
| CN | 201769018 U | * 3/2011 | |

(Continued)

OTHER PUBLICATIONS

International Search Report and Written Opinion dated Sep. 24, 2019, issued in connection with International Patent Application No. PCT/CA2019/050902 (12 pages).

(Continued)

*Primary Examiner* — Elizabeth M Kerr
*Assistant Examiner* — Alba T Rosario-Aponte
(74) *Attorney, Agent, or Firm* — McCarter & English, LLP

(57) ABSTRACT

A welding apparatus includes a welding torch mounted to a frame and electrically connectable in a source current path of a welding current source, and an electrically conductive return current roller rollably mounted to the frame a substantially fixed distance from the welding torch. The return current roller is electrically connectable in a return current path of the welding current source, and has a rim sized and shaped to roll in electrically conductive contact with an unwelded seam of a workpiece.

12 Claims, 7 Drawing Sheets

(56) References Cited

U.S. PATENT DOCUMENTS

| | | | |
|---|---|---|---|
| 4,341,938 A | 7/1982 | Matsubara et al. | |
| 5,726,410 A | 3/1998 | Fukushima et al. | |
| 5,935,357 A | 8/1999 | Hubbard et al. | |
| 6,268,581 B1 | 7/2001 | Nakamura et al. | |
| 6,627,004 B1 | 9/2003 | Lockhart | |
| 6,713,710 B1 | 3/2004 | Zhang | |
| 6,866,077 B2 | 3/2005 | Zurmuhle et al. | |
| 7,094,298 B2 | 8/2006 | Schwetz | |
| 7,498,542 B2 | 3/2009 | Pan et al. | |
| 7,745,757 B2 | 6/2010 | Enyedy et al. | |
| 8,002,165 B2 | 8/2011 | Zurbuchen et al. | |
| 8,487,214 B2 | 7/2013 | Doskocz | |
| 8,567,466 B2 | 10/2013 | Dugan | |
| 9,012,809 B2 | 4/2015 | Melin et al. | |
| 9,266,198 B1 | 2/2016 | Snead | |
| 9,724,789 B2 | 8/2017 | Matthews et al. | |
| 9,776,272 B2 | 10/2017 | Einav et al. | |
| 10,040,248 B2 | 8/2018 | Niederberger et al. | |
| 2007/0011858 A1 | 1/2007 | Maxwell et al. | |
| 2009/0314750 A1 | 12/2009 | Saitoh et al. | |
| 2010/0176106 A1 | 7/2010 | Christensen et al. | |
| 2011/0210110 A1 | 9/2011 | Dearman et al. | |
| 2012/0111843 A1 | 5/2012 | Beard et al. | |
| 2012/0231168 A1 | 9/2012 | Leiden et al. | |
| 2015/0033640 A1 | 2/2015 | Cantoni et al. | |
| 2015/0060436 A1 | 3/2015 | Kocks et al. | |
| 2015/0321280 A1 | 11/2015 | Einav et al. | |
| 2015/0367440 A1 | 12/2015 | Dieterich et al. | |
| 2021/0178528 A1 | 6/2021 | Kloepfer et al. | |

FOREIGN PATENT DOCUMENTS

| | | | | | |
|---|---|---|---|---|---|
| CN | 102114565 A | * | 7/2011 | | |
| CN | 202527860 U | * | 11/2012 | | |
| CN | 103990893 A | | 8/2014 | | |
| CN | 104353949 A | * | 2/2015 | ............. | B23K 37/02 |
| CN | 204639387 U | * | 9/2015 | | |
| CN | 103990893 B | | 6/2016 | | |
| CN | 105127552 B | * | 9/2017 | ............. | B23K 9/02 |
| CN | 207494766 U | | 6/2018 | | |
| TW | 201819089 A | | 6/2018 | | |
| WO | 2009/125460 A1 | | 10/2009 | | |
| WO | 2017/137515 A1 | | 8/2017 | | |
| WO | 2018/112618 A1 | | 6/2018 | | |
| WO | 2018/112622 A1 | | 6/2018 | | |
| WO | 2018/197634 A1 | | 11/2018 | | |

OTHER PUBLICATIONS

International Preliminary Report on Patentability dated Sep. 10, 2020, issued in connection with International Application No. PCT/CA2019/050902, including annexed Response to Written Opinion and Amendment under Article 34 PCT (23 pages).

Moggy, Item # GM-03-300, Moggy®—Magnetic Base—Stitch and Continuous Welding Carriage, printout from Gullco International, Inc. online catalog: http://catalog.gullco.com/item/weld-automation/ggy-portable-fillet-welding-travel-carriage-system/item-1268 [accessed Mar. 31, 2021] (3 pages).

Steelmax, Li'l Runner Portable Fillet Welding Carriage, printout of online product page: https://steelmax.com/product/lil-runner-portable-fillet-welding-carriage/ [accessed Mar. 31, 2021] (9 pages).

Canadian Office Action dated Sep. 22, 2023, issued in connection with Canadian Patent Application No. 3104904 (7 pages).

Canadian Office Action dated Sep. 25, 2023, issued in connection with Canadian Patent Application No. 3103005 (4 pages).

Office Action dated Nov. 6, 2023, issued in connection with U.S. Appl. No. 17/256,567 (20 pages).

Wel-Handy Multi II Tack/Stitch Operation Manual, Jun. 2016 (52 pages).

Canadian Office Action dated May 21, 2024, issued in connection with Canadian Patent Application No. 3103005 (5 pages).

Office Action dated Mar. 25, 2024, issued in connection with U.S. Appl. No. 17/256,567 (22 pages).

Koike Aronson, Inc. / Ransome, Wel-Handy Multi, "Multi-Purpose Mechanized Welding Carriage," Technical Brochure (Aug. 12, 2016 via https://web.archive.org/web/20160812084041/http://www.koike.com/documents/Product-Brochures/Welding/WELHANDYMULTI_PGA_ENG_WEB.pdf ) (4 pages).

Canadian Office Action dated Sep. 12, 2024, issued in connection with Canadian Patent Application No. 3103005 (16 pages).

Webpage http://www.koike.com/wel-handy-multi for "Wel-Handy Multi Lightweight, Compact, Welding Carriage" (link for Aug. 12, 2016 https://web.archive.org/web/20160812084409/http://www.koike.com/wel-handy-multi provided) (4 pages).

Canadian Office Action dated Sep. 12, 2024, issued in connection with Canadian Patent Application No. 3,104,904 (16 pages).

Office Action dated Apr. 21, 2025, issued in connection with U.S. Appl. No. 17/256,567 (25 pages).

Notice of Allowance dated Oct. 1, 2025, issued in connection with U.S. Appl. No. 17/256,567 (8 pages).

Office Action dated Nov. 13, 2025, issued by the Canadian Intellectual Property Office in connection with Canadian Patent Application No. 3,104,904 (4 pages).

* cited by examiner

RETURN CURRENT ROLLER FOR AUTOMATIC WELDER

RELATED APPLICATIONS

This application claims priority to U.S. Provisional Patent Application Ser. No. 62/948,412 filed on Dec. 16, 2019, the entire disclosure of which is hereby expressly incorporated by reference.

FIELD

The present disclosure relates generally to automatic electric welding machines, more particularly to automatic arc welding machines, and even more particularly to return current techniques in automatic arc welding machines.

BACKGROUND

Automatic electric welding machines (hereinafter, simply "welding machines") are widely used in industrial fabrication to join metal workpieces where the relative disposition of the workpieces and the configuration of the seam to be welded are sufficiently simple so as not to require the skill of a human welder. For example, automatic welding machines are widely used to join abutting flat panels which form a generally linear seam.

In some configurations, the panels are laid flat on a supporting surface to form seams to be welded. A welding head of the welding machine is suspended above the panels. The welding head and panels are moved relatively such that the welding head traverses the seam. For example, the welding head may be supported by a frame which is movably mounted to a gantry or rail. Alternatively, the welding head may be fixed, while the supporting surface of the panels is movable. In either case, the welding head and panels may be moved relatively to cause the welding head to travel along the seam, so as to enable welding along a length of the seam.

For example, U.S. Pat. No. 9,012,809 to Melin et al. teaches a welding device and a central element configured with sensor members to register geometric properties of a spacing between the work pieces. An auxiliary sensor means registers a vertical distance between the welding head and a bottom surface of the spacing between the work pieces. The auxiliary sensor means has a roller member attached to the central element including a lever-type design allowing the auxiliary sensor means to pivot around a pivoting point, to maintain contact between the roller member and the bottom surface during transport of the device along an operating direction. It is not taught, however, how the welding device is grounded.

In some configurations, the workpiece edges are overlapped. For example, in U.S. Pat. No. 5,726,410 to Fukushima et al, overlapping edge portions of the workpieces to be welding are squeezed together by roller electrodes with a welding current being applied between the roller electrodes. The roller electrodes are thus provided on opposite sides of the plate-like workpieces.

It remains commercially desirable to develop further improvements and advancements in automatic electric welding, to overcome shortcomings of known techniques, and to provide additional advantages.

BRIEF DESCRIPTION OF THE DRAWINGS

Embodiments will now be described, by way of example only, with reference to the attached Figures.

Figure 1:
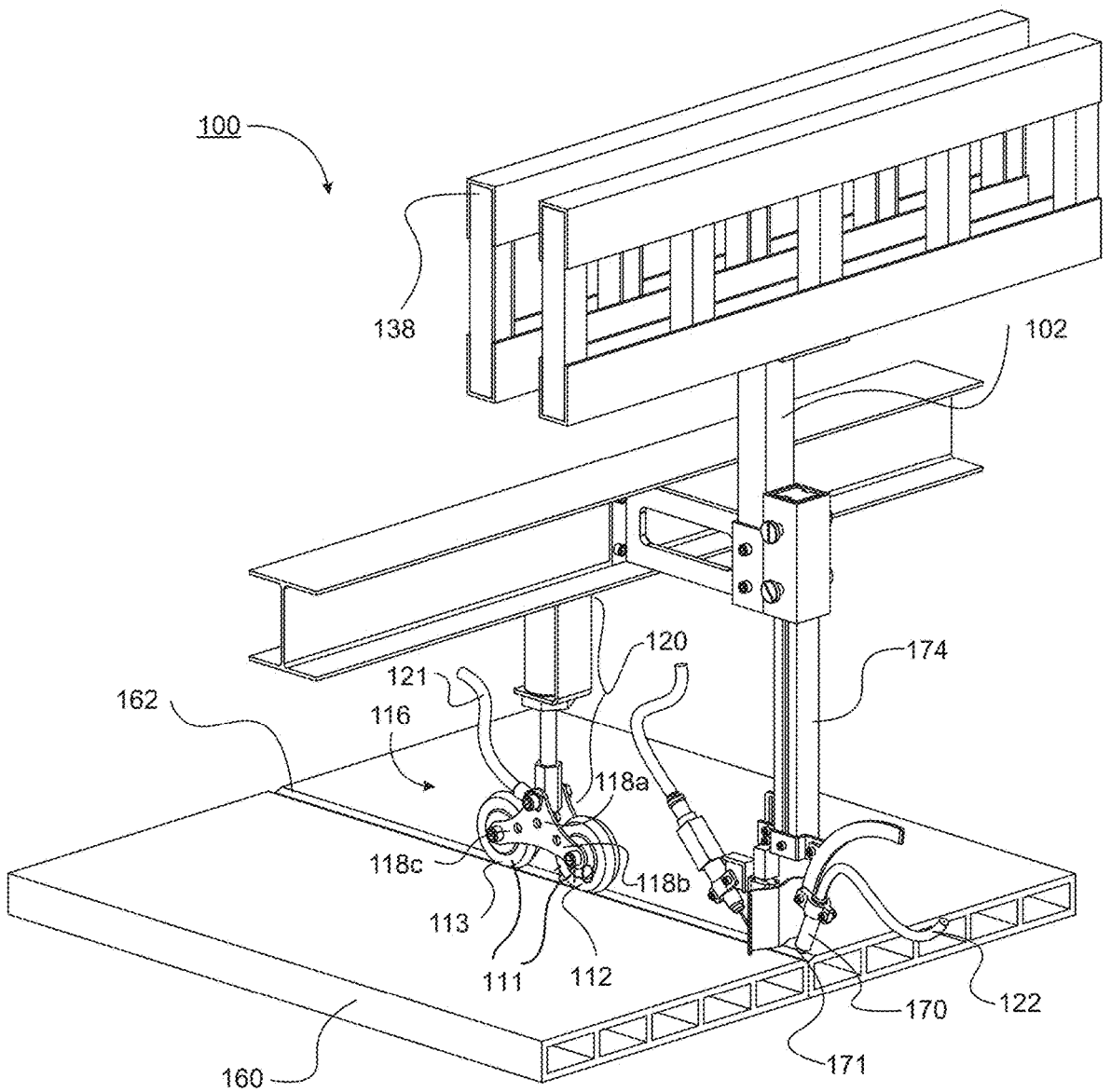
FIG. 1 is a front perspective view of a welding apparatus including an electrically conductive return current roller.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DESCRIPTION

Techniques for providing a return current path for an automatic electric welding apparatus are disclosed herein. In particular, disclosed herein are techniques for a welding apparatus 100 for use in performing any suitable welding, including but not limited to, electrical welding, including arc welding, including shielded metal arc welding, gas metal arc welding, flux-cored arc welding, gas tungsten arc welding, plasma arc welding, or automatic welding.

Figure 2:
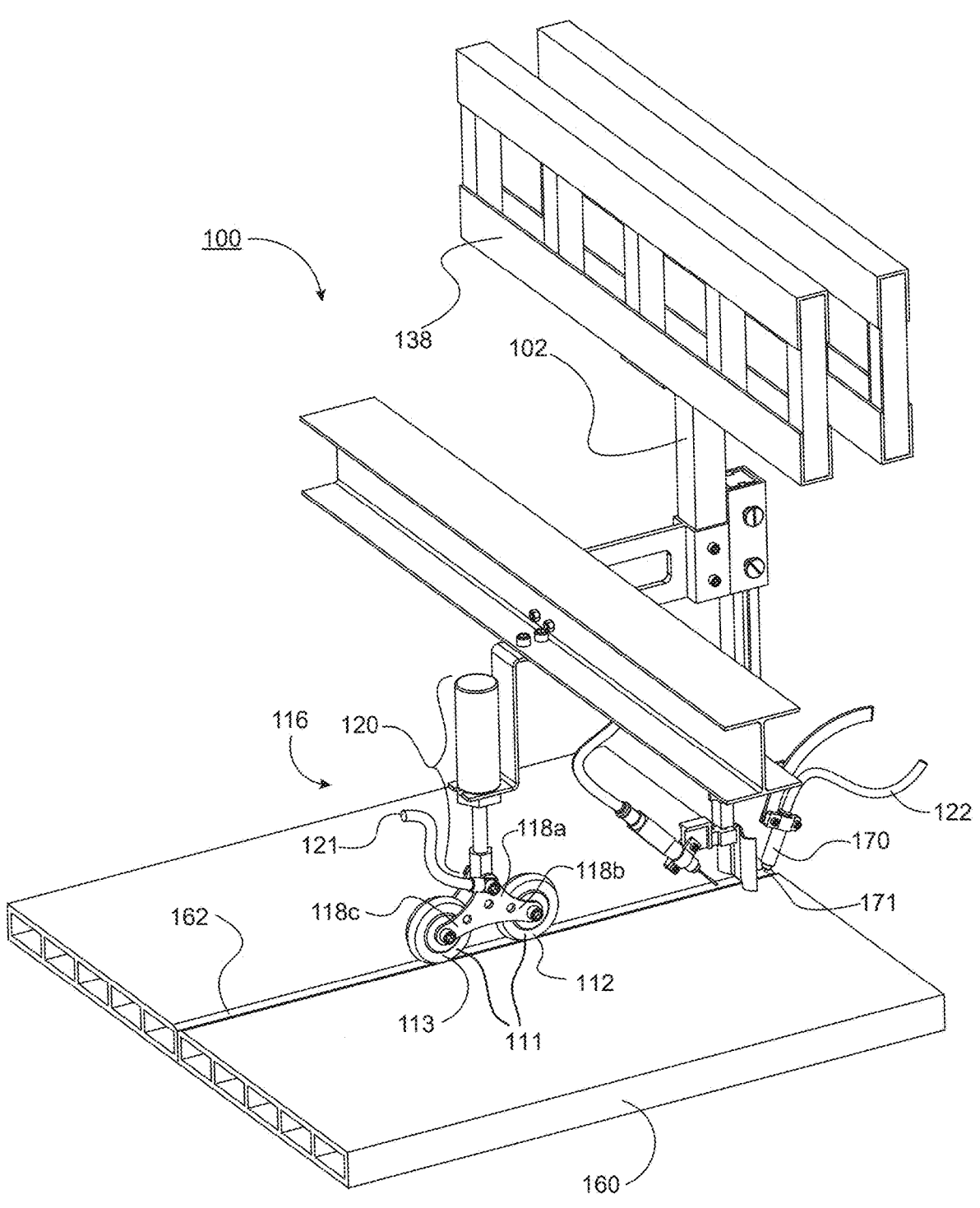
FIG. 2 is a side perspective view of the welding apparatus of FIG. 1.

FIGS. 1 and 2 illustrate perspective views of a welding apparatus 100 according to an embodiment herein. The welding apparatus 100 includes a frame 102, a return current roller assembly 116, and a welding torch 170 for welding an unwelded seam 162 of a workpiece 160. At least one roller 111 is rollably mounted in the return current roller assembly 116. At least one such roller 111 is an electrically conductive return current roller 111 as further disclosed herein. FIGS. 1 and 2 are illustrative of a two roller embodiment. Other embodiments disclose single roller embodiments including a welding apparatus 100 comprising a welding torch 170 and a single roller 111 rollably mounted in the current roller assembly 116. This arrangement enables rolling engagement between the at least one roller 111, including the return current roller 111, and the workpiece 160. In an embodiment, the welding apparatus 100 is actuated or driven to move in rolling engagement with a stationary workpiece 160. For example, the frame 102 may be mounted to or include a rail 138 whereby a motor (not shown) drives movement of the rail 138, and by extension, movement of the welding apparatus 100 over the workpiece 160 while the workpiece 160 remains stationary. In another embodiment, the welding apparatus 100 is stationary and the workpiece 160 moves relative to the welding apparatus 100, for rolling engagement therewith. In another embodiment, at least one of the welding apparatus 100 and the workpiece 160 are actuated or driven to enable relative rolling engagement between the welding apparatus 100 and the workpiece 160.

Figure 7:
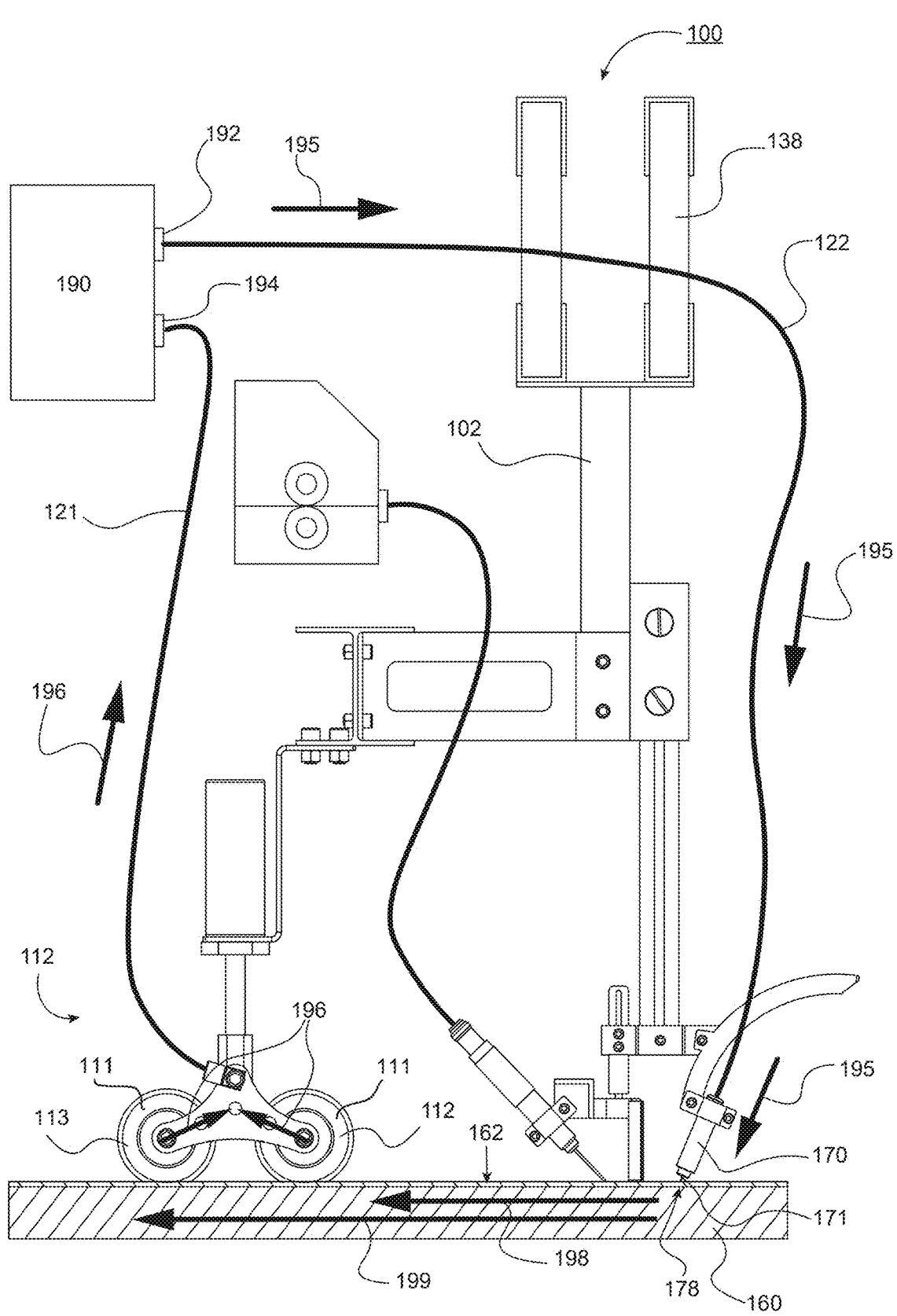
FIG. 7 is a figurative side elevation view of a welding apparatus having a welding torch electrically connected by a welding current lead to a welding current terminal of a current source, and return current roller rollers electrically connected by a return current lead to a return current terminal of the current source.

A welding torch 170 may be electrically connected by a welding current lead 122 to a welding current terminal 192 of a current source 190 (shown in FIG. 7). Accordingly, when using the welding torch 170 to weld an unwelded seam 162 of a workpiece 160, a welding current conducts along a source current path 195 from the current source 190 and draws into the workpiece 160 at a welding point 178 of a welding torch tip 171 of the welding torch 170 and the workpiece 160. The welding point 178 is understood to generally encompass a point where a weld pool is formed through application of heat from the welding torch tip 171. The weld pool, formed at the welding point 178, subsequently forms a weld through cooling and fusion of metals. In particular, the welding point 178 may not require direct contact between the welding torch tip 171 and the workpiece 160, in particular in methods of welding including but not limited to, electrical welding, arc welding, shielded metal arc welding, gas metal arc welding, flux-cored arc welding, gas tungsten arc welding, plasma arc welding, or automatic welding. In such welding techniques, and other similar and related welding techniques, the welding current draws into the workpiece 160, from the welding torch tip 171, at the welding point 178.

Techniques known in the art for providing a return current path include providing a workpiece clamp, sometimes called a "ground clamp", fixed to an end of the workpiece 160. The workpiece clamp may form part of a return current path to the current source, for example, by operatively connecting the workpiece clamp to a return current terminal of the current source. Such techniques however suffer the disadvantage of a variable return current path length through the workpiece, inasmuch as the welding torch tip 171 advances along the unwelded seam 162, current drawn into the workpiece 160 conducts over a varying distance to the workpiece clamp as a result of the changing distance between the welding torch tip 171 and the workpiece clamp. Such variability in return current path length degrades welding conditions, resulting in lower quality welds.

Thus, at least one roller 111 is an electrically conductive return current roller 111. The return current roller 111 is formed of a durable, conductive material, such as a conductive metal or alloy, which may be brass, copper alloy, aluminum, or any other suitable conductive material. The return current roller 111 is electrically connectable to a return current terminal 194 of a current source 190, such as by a return current lead 121 as shown in FIG. 7. Thus, the return current roller 111 functions as a return current electrode in a return current path 196 for welding current entering the workpiece 160 from the welding torch tip 171, and then exiting the workpiece 160.

Figure 5:
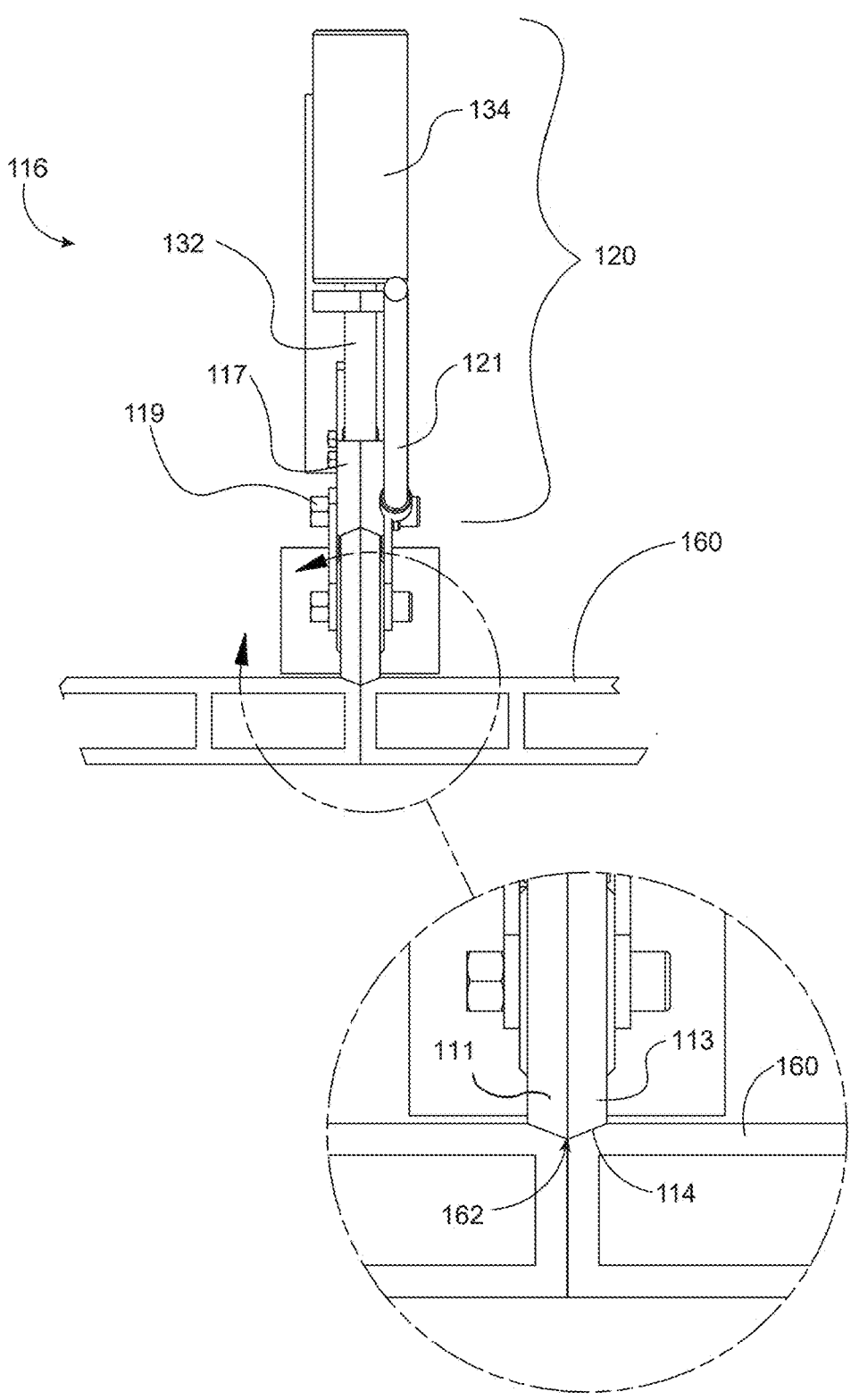
FIG. 5 is a front elevation view of a return current roller assembly as disclosed herein including an enlarged view of a return current roller having a circumferentially tapered V-shaped rim in conforming contact with an unwelded seam of a workpiece.

As shown especially in FIG. 5, the return current roller 111 may be sized and shaped for conformable contact with the unwelded seam 162 of the workpiece 160 for rolling in conforming engagement with the unwelded seam 162 sufficiently to maintain electrically conductive contact with the unwelded seam 162. The return current roller 111 sized and shaped for conformably rolling contact with the unwelded seam 162 may provide the further advantage of restricting rolling engagement of the return current roller 111 to within the unwelded seam 162, thereby laterally restricting and aligning movement of the welding apparatus 100 to the unwelded seam 162 as it rollingly engages the workpiece 160. The restricted movement of the welding apparatus 100 may be operative to position the welding torch 170 in alignment with the unwelded seam 162. Thus, as the welding apparatus 100 moves in rolling engagement with the workpiece 160, the welding torch 170 may be aligned to move along and weld the unwelded seam 162 as the welding torch 170 passes thereover. Alignment of the welding apparatus 100 with the unwelded seam 162 may be achieved at least in part by restricting rolling movement of the return current roller 111 to the unwelded seam 162. The return current roller 111 may be circumferentially tapered to form a V-shaped rim 114, as shown in FIG. 5. Generally, the profile of the rim of the return current roller 111 may be matched to a profile of the unwelded seam 162, including shapes other than a V-shape. For example the return current roller may have a rim circumferentially profiled in a circular shape, a semi-circular shape, an elliptical shape, or a semi-elliptical shape.

Figure 3:
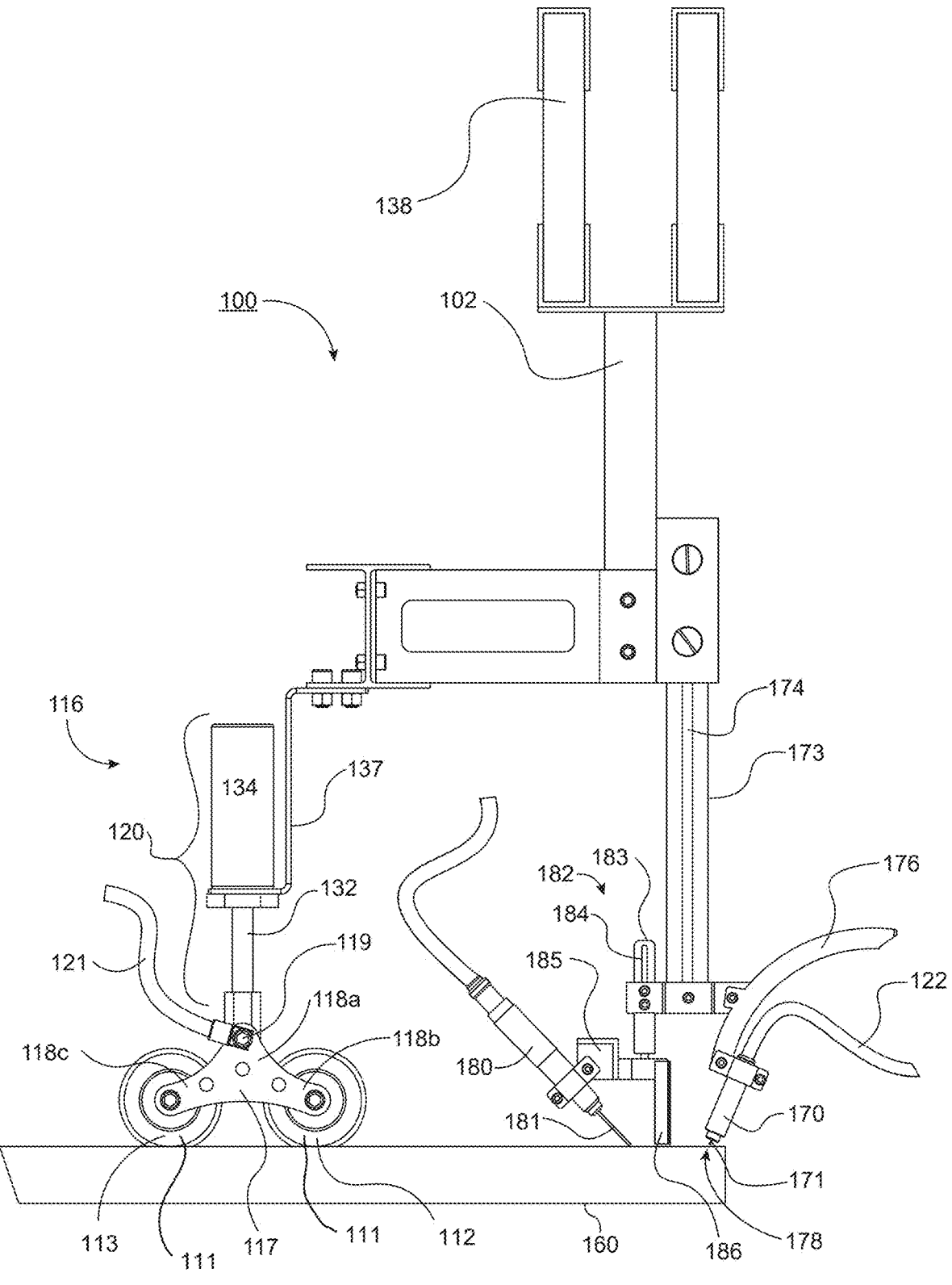
FIG. 3 is a side elevation view of the welding apparatus according to FIGS. 1-2.

As shown particularly in FIGS. 1-3, the welding torch 170 and the return current roller 111 may be mounted relative to one another in a substantively fixed spatial relationship for disposition of the welding torch tip 171 a substantively fixed distance from the return current roller 111, or each return current roller 111, as the case may be. In some embodiments, a first electrically conductive return current roller 112 and a second electrically conductive return current roller 113 are rollably mounted in a return current roller assembly 116 relative to the welding torch 170, wherein the first and second return current rollers 112, 113 are respectively mounted first and second substantively fixed distances apart from welding torch 170. A contact point between the one or more electrically conductive return current rollers 111 and the unwelded seam 162 enables current to exit the workpiece 160 through the respective return current roller 111 (shown in FIG. 7), which thus functions as a return current electrode in a return current path. Accordingly, a return current path through the workpiece 160 (arrows 198, 199) may be maintained at a substantively fixed length, or variability of such length may be minimized, thereby minimizing or at least decreasing variability in the electrical impedance of the return current path, thereby minimizing or at least decreasing variability in the welding current flowing into the workpiece 160 at the welding point 178 in the unwelded seam 162 where the welds are formed, and thereby maximizing, or at least improving, a quality of the welds thus formed. In an embodiment, the return current roller 111 is mounted to a frame 102 a substantially fixed distance apart from welding torch 170.

In an embodiment, a return current roller assembly 116 may include an A-frame assembly 117 mounted to a strut 120. A-frame assembly 117 may have three legs 118a, 118b, and 118c, as shown particularly in FIGS. 1-4. An orientation of the A-frame 117, such as a pitch of the A-frame assembly 117, is pivotably variable relative to the strut 120. In this manner, pivotably varying an orientation of the A-frame assembly 117 may advantageously maintain at least one roller 111 in rollingly conforming contact with an unwelded seam 162 as the rollers 111 traverse undulations and other deviations of the unwelded seam 162. In an embodiment, the A-frame assembly 117 is pivotable about a pin 119 by which the pivot leg 118a of the A-frame assembly 117 is mounted in the strut 120. The pivotable A-frame assembly 117 may include two electrically conductive return current rollers 111, which may leverage advantages of pivotably varying an orientation of the A-frame assembly 117.

Pivoting and by extension varying an orientation of the A-frame assembly 117 may rotatably displace a position of the rollers 111 relative to the strut 120. For example, as the return current rollers 111 conductively contact an unwelded seam 162, undulations or other deviations in the unwelded seam 162 may urge the return current rollers 111 to displace in a particular direction, causing the A-frame assembly 117 to correspondingly vary its orientation, for example by pivoting in a clockwise or counter clockwise direction. Undulations causing the A-frame assembly 117 to pivot in a counter-clockwise direction may result in a first return current roller 112 breaking electrically conductive contact with the unwelded seam 162 while concurrently transferring weight to a second return current roller 113, thereby exerting greater pressure on the second return current roller 113 to maintain electrically conductive contact with the unwelded seam 162. Conversely, undulations causing A-frame return current roller assembly 116 to pivot in a counter clockwise direction may result in the second return current roller 113 breaking electrically conductive contact with the unwelded seam 162 while concurrently increasing pressure on the first return current roller 112, thereby exerting greater pressure on the first return current roller 112 to maintain electrically conductive contact with the unwelded seam 162. As described herein, a return current roller assembly 116, such as an A-frame return current roller assembly 117, may advantageously pivot in response to the additional weight bearing on either the first return current roller 112 or the second return current roller 113, thereby maintaining at least one return current roller 111 in electrically conductive contact with the unwelded seam 162.

As an example, current drawn into the workpiece 160 may initially exit the workpiece 160 through the first return current roller 112, and subsequently exit the workpiece 160 through the second return current roller 113 in the event that the first return current roller 112 breaks electrically conductive contact with workpiece 160. As such, the return current path in the workpiece (arrows 198, 199) distance may experience some minor variance in length based on whether current drawn into the workpiece 160 exits through the first return current roller 112 and thus travels a first return current path in the workpiece (arrow 198) or the second return current roller 113 and thus travels a second return current path in the workpiece (arrow 199). Such variance in the return current path length may however be maintained at a substantively fixed length, or variability of such length may be minimized, thereby minimizing or at least decreasing variability in the electrical current flowing into the workpiece 160. For example, the first return current roller 112 and the second return current roller 113 may be mounted in the return current roller assembly 116, relatively close together, to minimize variance in the return current path length between the return current rollers 112, 113. Additionally, or alternatively, a distance between the first return current roller 112 and the second return current roller 113 may be proportionally small compared to the respective distances between the first return current roller 112 and the second return current roller 113, on the one hand, and the welding torch 170, on the other hand, such that the proportional change in return current path length resulting from changing of contact of the first return current roller 112 and the second return current roller 113 with the workpiece 160 is likewise proportionally small. Accordingly, a multi-roller pivotable return current roller assembly 116 may thus advantageously maintain at least one return current roller 111 in electrically conductive conforming contact while minimizing variance in the return current path length that may arise from one return current roller 111, or the other, breaking from electrically conductive contact with the unwelded seam 162. Other embodiments as disclosed herein further provide for varying an orientation or position of the return current roller assembly 116, such as by varying a heading or elevation of the return current rollers 111 relative to the frame 102, providing additional responsiveness to undulations, deviations, and other topographic features of the workpiece 160 and the unwelded seam 162.

As shown in FIG. 3, the welding apparatus 100 may include return current rollers 111 rollably mounted to the A-frame assembly 117 which is pivotably mounted to a strut 120 which is in turn mounted to the frame 102. In particular, a bracket 137 may support the strut 120, and may be supported in turn a rail 138. The welding torch 170 may be mounted to a welding torch mounting assembly 172, and the welding apparatus 100 may further have a filler rod feeder 180 mounted to a filler rod feeder mounting assembly 182. Each of the return current roller assembly 116 and welding torch mounting assembly 172 may be mounted to the frame 102 to maintain a substantially fixed distance between them, minimizing variability in welding conditions, as the welding apparatus 100 rollingly engages with and welds an unwelded seam 162 of a workpiece 160. In this way, a return current path length, including a distance travelled by the current in the workpiece 160 from the welding torch tip 171 and exiting the workpiece 160 through the return current rollers 111, may be substantially fixed when the welding apparatus 100 is in operation.

The welding torch 170 may be mounted to the frame 102 of the welding apparatus 100 by means of the welding torch mounting assembly 172. Alternatively, the welding torch 170 may be mounted directly to the frame 102. Regardless, the welding torch 170 may be mounted in such fashion as to remain spaced a substantively fixed distance from each respective return current roller 111. This establishes a return current path having a substantively fixed length based on a substantively fixed distance between where current enters the workpiece 160 from the welding torch tip 171 and where the current exits the workpiece 160 through the return current rollers 111.

In particular, the welding torch mounting assembly 172 may comprise a mounting arm 173 having a mounting arm slot 174, a mounting bracket 175, and a welding torch bracket 176 pivotally mounted to the mounting bracket 175. The welding torch 170 may be mounted to the welding torch bracket 176 which may pivot relative to the mounting bracket 175 for varying a position and/or orientation of the welding torch 170. Accordingly, the welding torch bracket 176 may be pivotable to position and orient the welding torch tip 171 relative to the workpiece 160, to locate the welding torch tip 171 in a position suitable for welding an unwelded seam 162 of a workpiece 160. A position of the welding torch 170, and by extension the welding torch tip 171, may be further varied by adjusting a position of the mounting bracket 175 within the mounting arm slot 174 of the mounting arm 173. For example, the mounting bracket 175 may affix to the mounting arm 173 using fasteners, or other adjustable mechanical coupling mechanisms and mounting techniques known in the art. A position of the mounting bracket 175 relative to the mounting arm 173 may be slidably adjusted by loosening the fastening or other coupling mechanism which engages the mounting bracket 175 with the mounting arm slot 174, and then sliding the mounting bracket 175 to a different position within mounting arm slot 174. Once moved to a new position, the mounting bracket 175 may be reaffixed to the mounting arm 173, to maintain a fixed position relative to the mounting arm 173. Accordingly, the mounting bracket 175 and the welding torch bracket 176 may cooperate to provide the welding torch 170, and by extension welding the torch tip 171, at a desired elevation, position, and orientation relative to workpiece 160. Once fixed in position, and by virtue of the welding torch mounting assembly 172 being fixedly attached to the frame 102, the spatial relationship between the welding torch 170 and the respective return current rollers 111, is maintained a substantively fixed distance apart.

The welding apparatus 100 may include other welding equipment, including a filler rod feeder 180 for providing a filler rod 181. The filler rod feeder 180 may be mounted to a filler rod feeder mounting assembly 182, as shown for example, in FIG. 3. The filler rod feeder mounting assembly 182 may comprise a filler rod feeder bracket 183 fastened or otherwise mechanically coupled to a mounting bracket 175, a filler rod feeder mounting arm 185 extending from the filler rod feeder bracket 183, and wherein the filler rod feeder 180 is pivotally attached to a filler rod feeder mounting arm 185. In an embodiment, the filler rod feeder mounting assembly 182 further comprises a welding shield 186 attached to the filler rod feeder mounting arm 185 for disposing the welding shield 186 between the filler rod feeder 180 and the welding torch 170. Similar to the welding torch mounting assembly 172, the filler rod feeder mounting assembly 182 may be operative to vary or adjust a position, elevation, and/or orientation of the filler rod feeder 180 relative to the workpiece 160, for locating the filler rod feeder 180 at a desired position. For example, a position or elevation of the filler rod feeder bracket 183 may be adjusted by fastening or mechanically coupling the filler rod feeder bracket 183 to the mounting bracket 175 at a desired location within the filler rod feeder bracket slot 184. Similarly, the filler rod feeder 180 may pivot relative to the filler rod feeder mounting arm 185, to vary a position or orientation of the filler rod feeder 180. In this manner, a position, orientation, and/or elevation of the filler rod feeder 180, may be varied or adjusted as desired.

Figure 4:
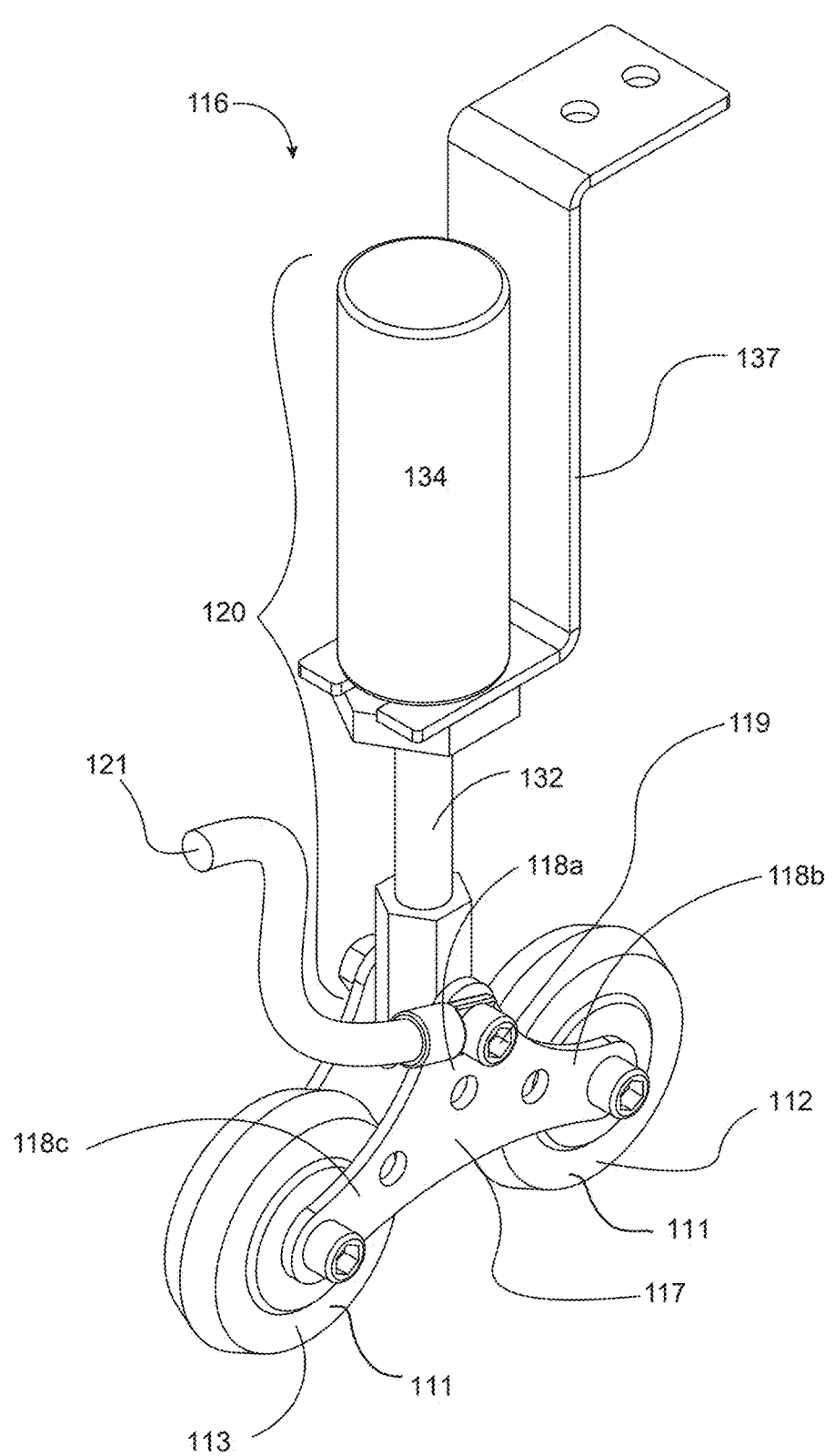
FIG. 4 is a front perspective view of a return current roller assembly according to FIG. 3 in isolation.

FIG. 4 further shows a front perspective of the return current roller assembly 116 in isolation. The strut 120 may include a strut rod 132 and a suspension device 134. The strut rod 132 may be coupled to the suspension device 134 for sliding movement of the strut rod 132 relative to the suspension device 134, which may be in-and-out of the suspension device 134. The suspension device 134 may be configured to urge the strut rod 132 out of, and away from, the suspension device 134, and may also include damping means. For example, the suspension device 134 may include a coilover (coil-over shock absorber), or may alternatively include a spring in a housing. The A-frame assembly 117 may be mounted to the strut rod 132, whereby an orientation or position, including an elevation of the A-frame roller assembly 117, may vary relative to the bracket 137, and thus the frame 102, by movement of the strut rod 132. For example, an orientation or position of the A-frame assembly 117 may vary by extension or retraction of the strut rod 132 in-and-out of the suspension device 134. As indicated above, the strut rod 132 may be urged outwardly to extend from the suspension device 134, towards the workpiece 160. In this manner extendedly urging the A-frame assembly 117 towards the workpiece 160 applies pressure between the return current rollers 111 and the workpiece 160. Constant application of pressure acting on the return current rollers 111 assists in maintaining the return current rollers 111 in electrically conductive conforming rolling contact with the unwelded seam 162. The suspension device 134 may be configured to permit retraction of the strut rod 132, thereby enabling movement of the A-frame assembly 117 toward the suspension device 134, and thus the frame 102. In this way the A-frame assembly 117 and return current rollers 111 may be configured to intimately track vertical undulations and other elevation changes in the unwelded seam 162. The A-frame assembly 117 may be mounted to the strut rod 132, or the strut rod 132 may be mounted to the suspension device 134, in such a way as to permit rotation of the A-frame assembly 117 about a longitudinal axis of the strut rod 132, to vary a heading of the A-frame roller assembly 117 and return current rollers 111. In this way the A-frame assembly 117 and return current rollers 111 may also be configured to intimately track lateral undulations in the unwelded seam 162.

As discussed herein, the return current roller 111 may have a circumferential rim sized and shaped for conforming contact with the unwelded seam 162. As shown particularly in FIG. 5, the return current roller assembly 116 may include the A-frame roller assembly 117 and return current roller 111 having a circumferentially tapered V-shaped rim 114. The V-shaped rim 114 may be tapered to conformingly roll in electrically conductive contact with the unwelded seam 162 having a similarly V-shaped cross-section. Tapering the rim 114 to a shape or contour of the unwelded seam 162 advantageously yields constant and reliable contact between the return current roller 111 and the unwelded seam 162, producing consistent welding conditions. A return current roller 111 having a rim 114, such as a circumferentially tapered V-shaped rim, sized and shaped for conformably rolling contact with the unwelded seam 162, may provide the further advantage of restricting rolling engagement of the return current roller 111 to the unwelded seam 162, thereby laterally restricting and aligning movement of the welding apparatus 100, including particularly the welding torch 170, and even more particularly the welding torch tip 171, to the unwelded seam 162 as it rollingly engages the workpiece 160.

Figure 6:
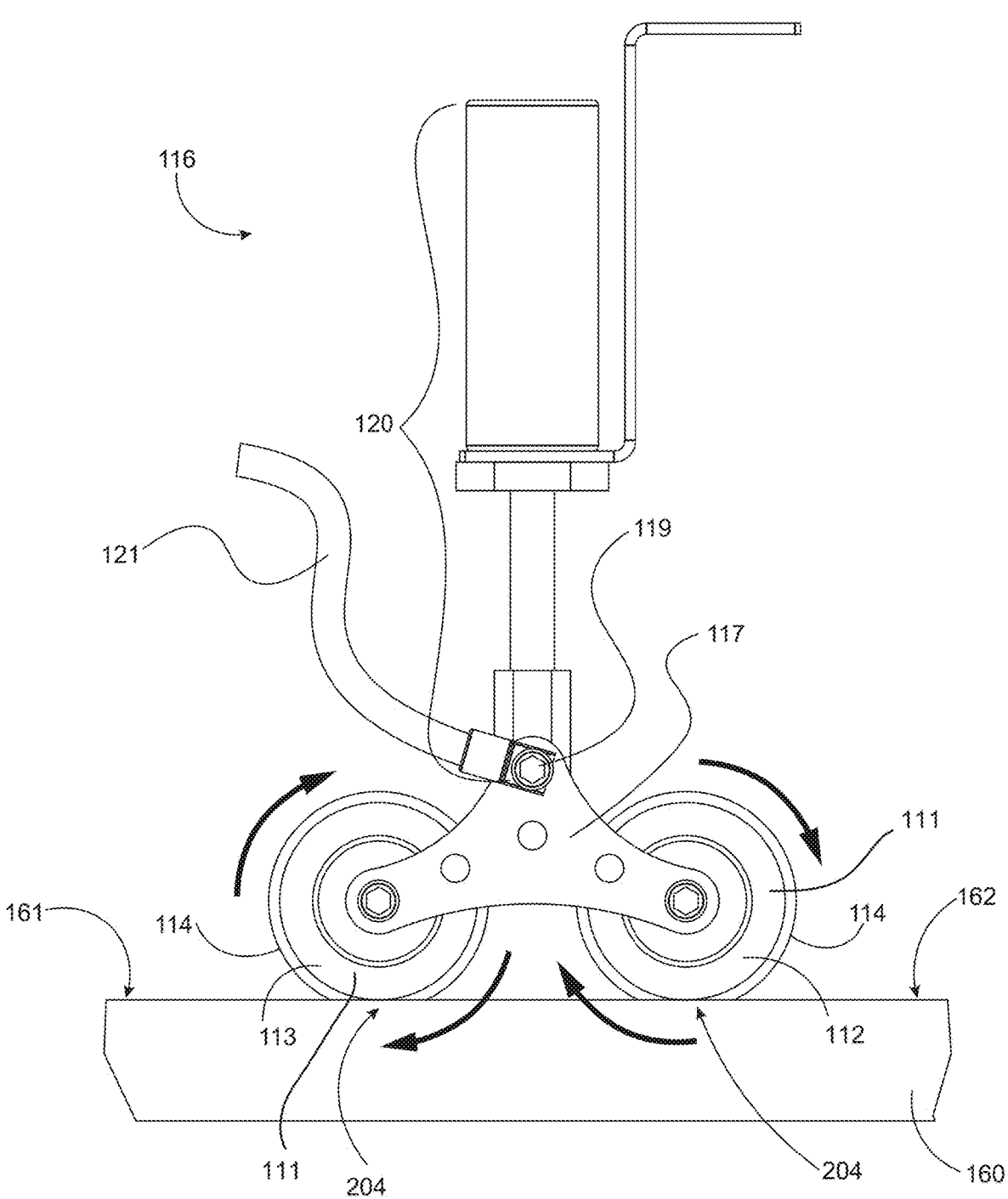
FIG. 6 is a side elevation view of two return current rollers according to FIG. 5, rolling in electrically conductive conforming contact with a workpiece.

FIG. 6 shows a side elevation view of the return current roller assembly 116, including the A-frame assembly 117, and illustrates how lateral movement of the welding apparatus 100 may be restricted by the return current rollers 111 having circumferentially tapered V-shaped rims 114, or other rims sized and shaped for rolling in conforming contact with the unwelded seam 162. As shown in FIG. 6, a side portion 204 of the rim 114 of each of the first return current roller 112 and the second return current roller 113 extends beneath a top surface 161 of the workpiece 160. Accordingly, any lateral force exerted against the return current rollers 111 causes the side portion of the rim 114 beneath the top surface 161 of the workpiece 160 to abut against a side of the unwelded seam 162. Such contact may prevent or restrict lateral movement of the return current rollers 111 relative to the unwelded seam 162, thereby restraining the return current rollers 111 to roll in conformably rolling electrically conductive contact along the unwelded seam 162.

FIG. 7 shows the welding apparatus 100 which may include a current source 190 having a current source terminal 192, and a return current terminal 194. A current source lead 122 electrically connects the current source terminal 192 and the welding torch 170, and conducts current from the current source 190 to the welding torch 170. A return current lead 121 electrically connects the return current terminal 194 and the return current rollers 111, and conducts current exiting the workpiece 160 through the return current rollers to the current source 190. Accordingly, a return current path is established whereby current entering the workpiece 160 from welding torch tip 171 subsequently returns to the current source 190. As disclosed herein, the spatial relationship between the welding torch 170 and the respective return current rollers 111 is maintained at a substantively fixed distance apart, thereby, a return current path is established having a substantively fixed return current path distance, for maintaining consistent electrical parameters and thereby maintaining consistent welding conditions and improving a quality of weld.

The embodiments illustrated in FIGS. 1-7 depict a single welding apparatus 100, however, the disclosure herein is not so limited. Other aspects of the disclosure include a welding apparatus system having a plurality of welding apparatus 100 as disclosed herein. Each welding apparatus 100 may be mounted to a common element or structure, such as a linear rail. For example, in an embodiment, a plurality of welding apparatus 100 may be mounted to a linear rail which rides on an overhead track, extending above a corresponding plurality of unwelded seams situated amongst one or more workpieces. A motor, or the like, may be used to drive or actuate movement of the linear rail, for correspondingly driving movement of each individual welding apparatus, to simultaneously move in relation to the workpiece(s) and weld each corresponding unwelded seam.

A common element or object, such as the linear rail, may further provide a common surface for ground and power lines to run along for each of the plurality of welding apparatus. Such comingling of lines however may give rise to cross-interference, cross-inductance, and other undesirable effects between the plurality of welding apparatus. Accordingly, the set of power and ground lines for each welding apparatus may be run within a steel sheath further contained within a non-conductive wrap, thereby minimizing cross-contamination effects with other welding apparatus. Each sheath of wires may be further isolated using plastic IGUS™ cable trays, further spaced with coolant lines in between each sheath of wires. Moreover, each steel sheath may be electrically bonded to machine ground only at a power source of the steel sheath.

The following are non-limiting embodiments according to the disclosure herein.

Embodiment 1. A welding apparatus, comprising: a welding torch mounted to a frame and electrically connectable in a source current path of a welding current source, and an electrically conductive return current roller rollably mounted to the frame a substantially fixed distance from the welding torch, the return current roller electrically connectable in a return current path of the welding current source, the return current roller having a rim sized and shaped to roll in electrically conductive contact with an unwelded seam of a workpiece.

Embodiment 2. The welding apparatus according to Embodiment 1, wherein the return current roller is circumferentially tapered to form a V-shaped rim.

Embodiment 3. The welding apparatus according to Embodiment 1 or 2, wherein a profile of the return current roller rim matches a profile of the unwelded seam of the workpiece.

Embodiment 4. The welding apparatus according to any one of Embodiments 1 to 3, wherein, when the welding apparatus is in use, the substantially fixed distance is between a contact point of the return current roller with the unwelded seam and a welding point of a welding torch tip of the welding torch in the unwelded seam.

Embodiment 5. The welding apparatus according to any one of Embodiments 1 to 4, wherein, when the welding apparatus is in use, the return current roller is operative as a return current electrode in the return current path between the welding torch and the welding current source.

Embodiment 6. The welding apparatus according to Embodiment 1, wherein the return current roller is a first electrically conductive return current roller, the welding apparatus further comprising: a return current roller assembly mounted to the frame, wherein the first return current roller is rollably mounted in the return current roller assembly a first substantially fixed distance from the welding torch; and a second electrically conductive return current roller rollably mounted in the return current roller assembly a second substantially fixed distance from the welding torch, wherein the first return current roller and the second return current roller are each electrically connectable in the return current path of the welding current source.

Embodiment 7. The welding apparatus according to Embodiment 6, wherein, when the welding apparatus is in use: the first return current roller is operative as a first return current electrode in a first return current path between the welding torch and the welding current source; and the second return current roller is operative as a second return current electrode in a second return current path between the welding torch and the welding current source.

Embodiment 8. The welding apparatus according to Embodiment 7, wherein: the first return current path has a first substantially fixed return current path length based on the first substantially fixed distance; and the second return current path has a second substantially fixed return current path length based on the second substantially fixed distance.

Embodiment 9. The welding apparatus according to any one of Embodiments 6 to 8, wherein: the first return current roller has a first rim sized and shaped to roll in electrically conductive contact with the unwelded seam of the workpiece; and the second return current roller has a second rim sized and shaped to roll in electrically conductive contact with the unwelded seam of the workpiece.

Embodiment 10. The welding apparatus according to Embodiment 9 wherein: a first profile of the first return current roller rim matches a profile of the unwelded seam of the workpiece; and a second profile of the second return current roller rim matches the profile of the unwelded seam of the workpiece.

Embodiment 11. The welding apparatus according to any one of Embodiments 6 to 10, wherein the return current roller assembly comprises a pivotable A-shaped frame wherein an orientation of the return current roller is pivotally variable.

Embodiment 12. The welding apparatus according to Embodiment 10, wherein the return current roller assembly comprises a pivotable A-shaped frame wherein an orientation of the return current roller is pivotally variable, and when the welding apparatus is in use, the orientation of the return current roller assembly is pivotally variable to maintain at least one of the first and second return current rollers in electrically conductive contact with the unwelded seam.

Embodiment 13. The welding apparatus according to any one of Embodiments 6 to 12, wherein the first return current roller is circumferentially tapered to form a first V-shaped rim, and the second return current roller is circumferentially tapered to form a second V-shaped rim.

Embodiment 14. The welding apparatus according to any one of Embodiments 6 to 13, wherein, when the welding apparatus is in use: the first substantially fixed distance is between a first contact point of the first return current roller with the unwelded seam and a welding point of a welding torch tip of the welding torch in the unwelded seam; and the second substantially fixed distance is between a second contact point of the second return current roller with the unwelded seam and the welding point.

Embodiment 15. The welding apparatus of any one of Embodiments 6-14, wherein the return current roller assembly is mounted to a strut, wherein the strut is mounted to the frame, and the strut is operative to vary a position of the return current roller assembly.

Embodiment 16. The welding apparatus of Embodiment 15, wherein the strut comprises a suspension device comprising a strut rod, wherein the strut is mounted via a bracket to the frame, wherein the strut rod is coupled for sliding moving relative to the suspension device, to vary the position of the return current roller assembly.

Embodiment 17. The welding apparatus according to Embodiment 16, wherein the suspension device is operative to urge extension of the strut rode from the suspension device.

Embodiment 18. The welding apparatus according to Embodiment 16 or 17, wherein the suspension device comprises a coilover.

Embodiment 19. The welding apparatus according to any one of Embodiments 6-18, wherein the return current roller assembly is rotatably mounted to the frame for varying an orientation of the return current roller assembly.

Embodiment 20. A welding system comprising a plurality of welding apparatus according to any one of Embodiments 1-19 wherein the frame corresponding to each of the plurality of welding apparatus is coupled to a moveable rail.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A welding apparatus comprising:
a welding torch mounted to a frame and electrically connectable in a source current path of a welding current source;
a return current roller assembly comprising a pivotable A-shaped frame wherein a pitch of the A-shaped frame is pivotally variable, the return current roller assembly is pivotably mounted to a strut, the strut is mounted to the frame, and the return current roller assembly is rotatable about a longitudinal axis of the strut;
a first electrically conductive return current roller rollably mounted in the return current roller assembly a first fixed distance from the welding torch, and second electrically conductive return current roller rollably mounted in the return current roller assembly a second fixed distance from the welding torch,
wherein the first return current roller and the second return current roller are each electrically connectable in a return current path of the welding current source, and respectively have a first rim and a second rim each sized and shaped to roll in electrically conductive contact with an unwelded seam of a workpiece, and wherein the frame is coupled to a moveable rail for movement of the welding torch and the return current roller assembly together along the unwelded seam on a same side of the workpiece.

2. The welding apparatus of claim 1, wherein, when the welding apparatus is in use:
the first return current roller is operative as a first return current electrode in a first return current path between the welding torch and the welding current source; and
the second return current roller is operative as a second return current electrode in a second return current path between the welding torch and the welding current source.

3. The welding apparatus of claim 2, wherein:
the first return current path has a first fixed return current path length based on the first fixed distance; and
the second return current path has a second fixed return current path length based on the second fixed distance.

4. The welding apparatus of claim 1, wherein:
a first profile of the first return current roller rim matches a profile of the unwelded seam of the workpiece; and
a second profile of the second return current roller rim matches the profile of the unwelded seam of the workpiece.

5. The welding apparatus of claim 1, wherein the first return current roller is circumferentially tapered to form a first V-shaped rim, and the second return current roller is circumferentially tapered to form a second V-shaped rim.

6. The welding apparatus of claim 1, wherein, when the welding apparatus is in use:
the first fixed distance is between a first contact point of the first return current roller with the unwelded seam and a welding point of a welding torch tip of the welding torch in the unwelded seam; and
the second fixed distance is between a second contact point of the second return current roller with the unwelded seam and the welding point.

7. The welding apparatus of claim 1, wherein the strut comprises a suspension device comprising a strut rod, wherein the strut is mounted via a bracket to the frame, wherein the strut rod is coupled for sliding movement relative to the suspension device, to vary a position of the return current roller assembly along the longitudinal axis.

8. The welding apparatus of claim 7, wherein the suspension device is operative to urge extension of the strut rod from the suspension device.

9. The welding apparatus of claim 7, wherein the suspension device comprises a coilover.

10. A welding system comprising a plurality of welding apparatus of claim 1, wherein the frame corresponding to each of the plurality of welding apparatus is coupled to the moveable rail.

11. The welding apparatus of claim 1, wherein the welding torch and the return current roller assembly are respectively mounted to the frame on a same side of the frame.

12. The welding apparatus of claim 1, wherein the welding torch and the return current roller assembly are respectively positioned for alignment of the electrically conductive contact of the respective rims of the first return current roller and the second return current roller, and a welding point of a welding torch tip of the welding torch with the unwelded seam on a same side of the workpiece.

* * * * *